United States Patent
Yamashita et al.

(10) Patent No.: US 6,375,701 B1
(45) Date of Patent: Apr. 23, 2002

(54) METHOD OF JUDGING SLAG FORMING STATE IN ELECTRIC FURNACE STEEL PRODUCTION AND METHOD OF OPERATING ELECTRIC FURNACE

(75) Inventors: Katsutoshi Yamashita; Arata Ueda; Toyohito Nakahara, all of Okayama (JP)

(73) Assignee: Kawasaki Steel Corporation, Hyogo (JP)

(*) Notice: Subject to any disclaimer, the term of this patent is extended or adjusted under 35 U.S.C. 154(b) by 0 days.

(21) Appl. No.: 09/445,960
(22) PCT Filed: Apr. 21, 1998
(86) PCT No.: PCT/JP98/01828
§ 371 Date: Dec. 16, 1999
§ 102(e) Date: Dec. 16, 1999
(87) PCT Pub. No.: WO99/54512
PCT Pub. Date: Oct. 28, 1999

(51) Int. Cl.[7] .............................. C21B 13/12; C21C 5/52
(52) U.S. Cl. ..................... 75/10.12; 75/10.38; 75/10.6; 75/10.66; 75/385; 65/20
(58) Field of Search ................................ 75/581, 10.12, 75/10.66, 10.6, 10.38, 566, 569, 561, 385; 65/20

(56) References Cited

U.S. PATENT DOCUMENTS

| | | | | |
|---|---|---|---|---|
| 4,308,415 A | * | 12/1981 | Haseqawa | 373/84 |
| 4,349,382 A | * | 9/1982 | Schleimer et al. | 75/60 |
| 4,362,556 A | * | 12/1982 | Kishida | 75/12 |
| 5,714,113 A | * | 2/1998 | Gitman et al. | 266/182 |
| 5,954,855 A | * | 9/1999 | Gitman et al. | 75/10.42 |
| 6,171,364 B1 | * | 1/2001 | Sarma et al. | 75/382 |

FOREIGN PATENT DOCUMENTS

| | | | |
|---|---|---|---|
| JP | 56136915 A | * | 10/1981 |
| JP | 5919170 | * | 5/1984 |
| JP | 6260810 | * | 3/1987 |
| JP | 7166222 | * | 3/1995 |
| JP | 9280736 | * | 10/1997 |
| JP | 10102128 | * | 4/1998 |
| JP | 10121123 | * | 5/1998 |

OTHER PUBLICATIONS

Electric Furnace Steelmaking, vol. 1: Design Operation, and Practice: edited by Clarence E. Sims p. 284 1962.*
Iron & Steelmaring, Oct. 1987 vol 14, No 10 pp 11–14.*

* cited by examiner

Primary Examiner—Roy King
Assistant Examiner—Tima McGuthry-Banks
(74) Attorney, Agent, or Firm—Young & Thompson

(57) ABSTRACT

The state of slag foaming generated in an electric furnace steel manufacture is judged by measuring the $NO_x$ amount in exhaust gas. The foaming state is adjusted to completely interrupt the contact of melted steel with air so that low nitrogen of the steel is always achieved or reduction of electric power consumption rate is achieved. Thus, in the manufacture of steel by subjecting iron scrap to dissolving, refining and heating stages successively in an electric arc furnace, the $NO_x$ amount in the exhaust gas is measured at the refining and heating stages of the melted steel and then the state of the slag foaming is judged depending upon the measured data.

9 Claims, 6 Drawing Sheets

METHOD OF JUDGING SLAG FORMING STATE IN ELECTRIC FURNACE STEEL PRODUCTION AND METHOD OF OPERATING ELECTRIC FURNACE

TECHNICAL FIELD

The present invention relates to a method of judging the slag foaming in steel manufacture by electric furnace and also to a method of operating the electric furnace utilizing that. More particularly, it relates to an art where a suitability of slag foaming generated during the refining process in an electric furnace is judged by measuring the $NO_x$ amount in an exhaust gas and also to an art of conducting the operation by completely inhibiting the contact of melted steel and air by means of adjusting said slag foaming state.

BACKGROUND ART

Method of manufacture of steel using electric arc furnace has the following advantages as compared with the conventional steel manufacture method in which blast furnace and converter are combined with an object of a mass production (hereinafter, referred to as "blast furnace-converter steel manufacture method").

[1] initial cost for investment is small as compared with a blast furnace-converter steel manufacture method;

[2] adjustment of production amount is easy; and

[3] it is able to easily deal with various changes in the main materials.

Therefore, as a result of recognition of those advantages, the cases where steel manufacture method using electric furnace is selected are recently increasing for the manufacture of melted steel.

Incidentally, many of the melted steel obtained by an electric furnace steel manufacture method contains much tramp elements such as Cu, Sn and Cr as compared with a converter steel because the main materials therefor are various kinds of iron scrap and, in addition, its nitrogen content is as high as 70–120 ppm whereby it has been usually used for the manufacture of the so-called low-class steel products such as steel bars and sections. With regard to the fact that there are much amount of tramp elements such as Cu, Sn and Cr among the above reasons, that can be partly dealt with by controlling the stock and supply of the iron scrap. However, the fact of high nitrogen content is a cause of internal crack and surface crack of cast iron pieces during a continuous casting and deterioration in ductility and surface scratch of steel materials during hot rolling. Even when it is made in to a steel product, tensile strength and aging are deteriorated in wire rods and, in the case of cold rolled thin sheet, yield strength increases and deep drawability is deteriorated. Accordingly, when development of the melted steel manufactured by an electric furnace steel manufacture to high-class steel is considered, a reduction of the nitrogen content is a big problem which is unavoidable and inevitable.

The fundamental phenomena per se of denitrification and nitrification reactions of melted steel in an electric furnace are as same as those in a converter and it is believed that the nitrogen content in the melted steel is decided upon its outgoing from the furnace when denitrifying and nitrifying rates are balanced. On the contrary however, as compared with the steel manufacture by a converter, the electric furnace steel manufacture has big differences in terms of equipment and operation as given below.

(1) The furnace is substantially in an open system (note that, particularly near the electrodes, sealing is difficult) and, as compared with a converter, much amount of air is sucked and the nitrogen content in the atmosphere in the furnace is much.

(2) In the arc, the components of the atmospheric gas are atomized and the melted steel is apt to suck the nitrogen in the atmospheric gas at an arc spot (which is a contact point of the arc with the melted steel).

(3) As compared with a converter, generation of carbon monoxide gas is small and, even under reduced pressure, denitrification is small.

In view of the above, a reduction in the nitrogen content in the melted steel by an electric furnace steel manufacture has been conducted by the use of materials containing high amount of carbon such as reduced iron or pig iron or by bubbling a carbon material into the melted state so that the so-called slag foaming is promoted in which the carbon monoxide gas generation from the melted steel surface is increased. In other words, contact of the atmospheric gas with the melted steel surface is interrupted by means of the foaming slag whereby a reduction in amount of sucked nitrogen caused by the above (1) and (2) and a promotion of denitrification by the effect of (3) have been attempted. For example, in the Japanese Laid-Open Patent Publication Sho-53/43003, there is a disclosure on an art in which "upon dissolution of the materials to be dissolved, an oxidizer such as mill scale dust or the like is added to the melted steel in an amount to make

[Effective Oxygen Concentration (wt %) in Oxidizer]≧[(Carbon Concentration in Scrap (wt %)−0.12)×4/3]

whereupon the carbon concentration in a steel bath during the above-mentioned material is melted down is made not more than 0.12 wt % and then carbon material is bubbled into such a melted steel via a carrier gas until the aimed carbon amount is achieved".

Further, in the Japanese Laid-Open Patent Publication Hei-03/28312, there is a disclosure on the art that "into a melted steel in an electric furnace is bubbled solid carbon, aluminum ash or flux (a slag foaming agent) by means of a carrier gas which is the gas generated from coke oven, blast furnace or converter or a mixture thereof". Thus, coke furnace gas, blast furnace gas or/and converter gas is/are used as a means for increasing the carbon concentration in the melted steel after it is melted down. Furthermore, in the Japanese Laid-Open Patent Publication Sho-52/147513, there is a disclosure on the art that "in an arc furnace for steel manufacture, electrode is made hollow and one or more of the inert gas such as argon and the reductive gas such as hydrogen carbide is/are supplied thereto and, at the same time, the carbon amount in the melted steel when it is melted down is made 0.1% or more while an average temperature rising rate in a reductive stage of the melted steel is made 10° C./minute or slower".

DISCLOSURE OF THE INVENTION

However, although all of the above-mentioned prior art literatures are effective for promotion of slag foaming, any of them is unable to control the degree of slag foaming (hereinafter, referred to as "state") or to confirm the effect resulted thereby. Therefore, even when the above art is adopted, an operator will just conduct an operation to such an extent that the bubbling rate of carbon material is changed by checking the state in the furnace and operator does not substantially conduct an operation confirming the effect of slag foaming for preventing the nitrogen absorption. Accordingly, it is unavoidable that the state of slag foaming differs for each of the charges and it is difficult to steadily prepare the melted steel containing low nitrogen.

In addition, the principle of denitrification is understood as diffusion and discharge of nitrogen into carbon monoxide foams generated in the steel bath in the case of steel manufacture by an electric arc furnace as same as in the case of the converter steel manufacture. Therefore, the more the decarburization rate from the melted state, the more the denitrification. However, even if generation of carbon monoxide gas is increased to promote the denitrification, the outcome will be all right during the carbon monoxide gas is generated but, if the nitrification rate from the above-mentioned arc spot becomes higher than the denitrification one at the final stage of the operation where generation of carbon monoxide gas decreases, the nitrogen content in the melted steel increases together with the progress of the operation. Especially in the case of operation in an electric furnace, it is usual that the temperature of the melted steel does not arrive the aimed outgoing steel temperature even when the carbon concentration in the melted steel is low. Since nitrifying amount at the heating process is big in such a final phase of the operation, the nitrogen amount in the melted steel at the outgoing stage is often in the same degree as that in the conventional operations even if bubbling of carbon material is conducted by various methods. Accordingly, it is difficult to steadily obtain the melted steel containing low amount of nitrogen even if bubbling of carbon material is conducted or a material containing high amount of carbon is used by adopting the above-mentioned prior art literatures. Further, some carbon materials contain much amount of nitrogen and, therefore, there is a case where bubbling of carbon material rather results in an increase of the nitrogen amount in the melted steel whereby selection of due carbon material is necessary as well.

In addition, "a method of supplying an inert gas or a reductive gas from the hollow of a hollow electrode" as mentioned in the above Japanese Laid-Open Patent Publication Sho-52/147513 is surely effective in suppressing the nitrification from an arc spot but, on the other hand, electrodes are made hollow and amounts of inert gas and reductive gas significantly increase resulting in a rise of a cost whereby there is a problem that said method is hardly applicable for practical use.

Under such circumstances, an object of the present invention is to offer a method for the operation of electric furnace where the adaptability of the slag foaming state generated in an electric furnace steel manufacture can be judged by measuring the $NO_x$ amount in exhaust gas and, at the same time, the foaming state is adjusted to completely interrupt the contact of melted steel with air so that low nitrogen amount is always achieved upon outgoing of the steel or reduction of electric power consumption rate is achieved.

Figure 1:
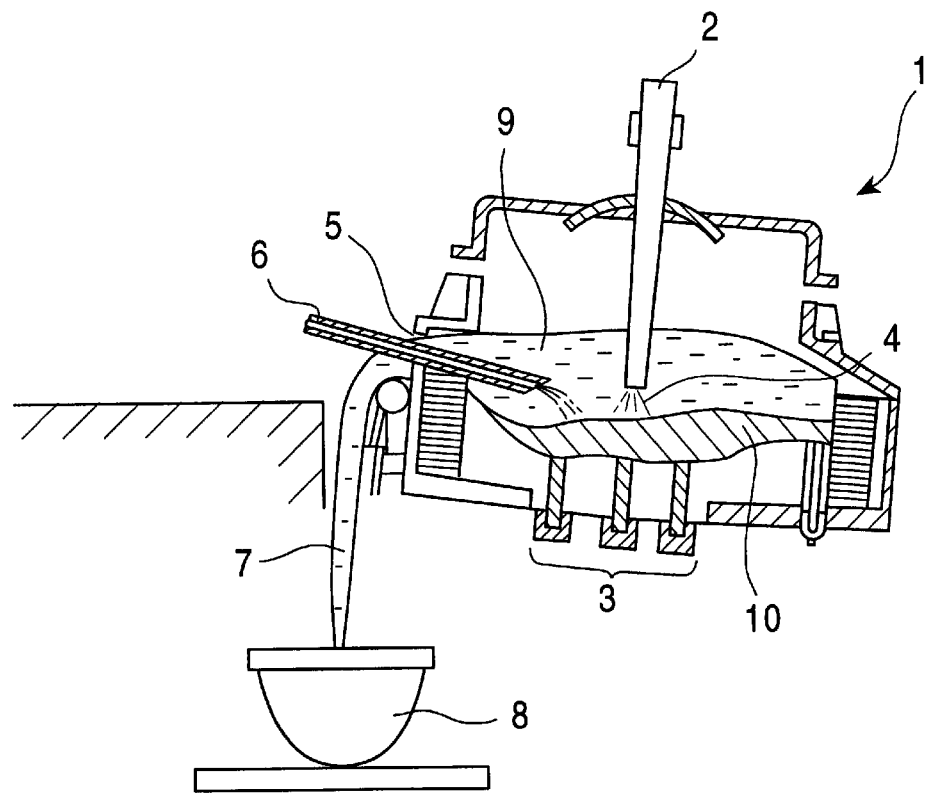
FIG. 1 is a longitudinal cross section showing the electric arc furnace in which the present invention is conducted and the slag foaming state in the furnace.

EXPLANATION OF THE SYMBOLS 1 electric arc furnace
2 upper electrode
3 electrode on the furnace bottom
4 arc
5 outlet for slag
6 acid-sending lance (acting as a means for bubbling a carbon material as well)
7 slag
8 slag pan
9 foamed slag
10 melted steel (melted hot liquid)
11 flue
12 gas collecting site
13 filter
14 pump
15 $NO_x$ measuring device
16 dust collector

BEST MODES FOR CONDUCTING THE INVENTION

In order to achieve the above-mentioned object, the present inventors have investigated for grasping the slag foaming state generated in an electric furnace. As a result, we have noticed of formation of $NO_x$ at a contact point (arc spot) of air with steel and thought that, if the foaming state of slag is good, contact of melted steel with air can be prevented and no $NO_x$ is generated. Thus, the present inventors have intensively tried to embodying this thought and, during the course thereof, they have found that generated amount of $NO_x$ has a close relation with the electric power consumption rate in operation by electric furnace whereby the present invention has been accomplished.

Thus, the present invention relates to a method for judging the slag foaming in an electric furnace steel manufacture, characterized in that, in the manufacture of melted steel by subjecting the iron scrap to dissolving, refining and heating successively in an electric arc furnace, the $NO_x$ amount in the exhaust gas is measured at the refining and heating stages of the melted liquid and then the state of the slag foaming is judged depending upon said measured data.

The present invention further relates to a method for judging the slag foaming in an electric furnace steel manufacture, characterized in that, initiation of the above refining stage is made at the time when dissolution of the iron scrap is finished and the melted steel surface becomes flat or when the melted steel temperature becomes higher than 1550° C.

The present invention still further relates to a method for operating the electric furnace, characterized in that, in the manufacture of melted steel by subjecting the iron scrap to dissolving, refining and heating successively in an electric arc furnace, a carbon material is bubbled into the slag in such a manner that the melted steel is covered by the slag depending upon the judgement of the slag foaming state as mentioned above during the refining and heating stages of the melted liquid whereby said slag is subjected to foaming.

The present invention furthermore relates to a method for the operation of the electric furnace, characterized in that, the above-mentioned slag foaming state is evaluated by accumulated data of the $NO_x$ amount in the exhaust gas measured from the stage when the material is melted down and, in order to make said accumulated $NO_x$ amount 2000 ppm×min or less, a carbon material is bubbled into the slag so as to cover the melted liquid with the slag during refining and heating stages of the melted liquid whereby a slag foaming is conducted.

The present invention still furthermore relates to a method for the operation of the electric furnace, characterized in that, the above-mentioned carbon material is coke powder of 0.2 mm or smaller in size or one or more which is/are selected from melted pig iron, solid pig iron, reduced iron and iron carbide is/are compounded with the above-mentioned iron scrap to give a main material.

The present invention moreover relates to a method for the operation of the electric furnace, characterized in that, 40–60% by weight of the above-mentioned main material is melted pig iron and/or solid pig iron or the above-mentioned melted steel is a low-nitrogen melted steel containing less than 70 ppm of nitrogen.

In that case, the slag foaming state means that the melted steel is covered by a foamed slag and, when it is completely covered including the arc spot area of the electrodes of the electric furnace, generation of $NO_x$ is nil and that is most preferred. In accordance with the present invention, the slag foaming state in the electric furnace is judged by measuring the $NO_x$ amount in the exhaust gas and, therefore, it is now possible to precisely grasp the state of foaming which has been relied on feeling or perception of operators until now. In addition, the state of foaming can be controlled and, therefore, it is now possible to prevent the absorption of nitrogen during refining and heating stages and also to maintain the nitrogen content in the melted steel in a low level. Further, the melted liquid surface is surely covered by foamed slag and, therefore, it is now possible to prevent the thermal diffusion from the melted liquid and also to significantly reduce the electric power consumption rate in the operation. Further, according to the present invention, the slag foaming state in the electric furnace is judged by the accumulated data of the $NO_x$ amount in the exhaust gas to be measured and, when said accumulated $NO_x$ amount is made within a predetermined range, it is now possible to control the nitrogen amount in the melted steel or to operate the electric furnace at a predetermined electric power consumption rate.

The present invention will now be illustrated for each of the steps by referring to the drawings.

First, a main material consisting of iron scrap and one or more which is/are selected from melted pig iron, solid pig iron, reduced iron and iron carbide is heated by means of arc (4) generated between the upper electrode (2) and the furnace bottom electrode (3) in an electric arc furnace. At that time, the outlet for slag (5) of the furnace is completely closed during the time zone (dissolution stage) until the above main material is completely melted to form the so-called flat bath (flat bath surface). In other words, the slag outlet (5) is made completely closed whereby suction of air into the furnace is suppressed to a minimum extent, nitrogen concentration of the atmosphere in the furnace becomes low and melting of the main material can be achieved under such a state that nitrification into the melted steel (10) in the above-mentioned arc spot is minimum. Incidentally, decision for the time when transition from the dissolving stage to the refining stage takes place varies for each of the companies and, therefore, in the present invention, it is set at the time when the above-mentioned flat bath is achieved or when the temperature of the melted liquid (10) becomes higher than 1550° C.

Then, during the refining and heating stages, various reactions including decarburization from the melted steel (10) take place and, in the electric furnace (1), gas mainly consisting of carbon monoxide is generated. In addition, the slag (9) formed by the refining reaction bubbles containing a part of said gas as shown in FIG. 1 and its height increases as if covering the melted liquid surface. On the other hand, nitrification of the melted steel (10) is caused by invasion of air into said arc spot and, during said invasion of air, denitrification and $NO_x$ generation take place in the arc spot area and said $NO_x$ contaminates in the exhaust gas on the melted steel surface.

Figure 2:
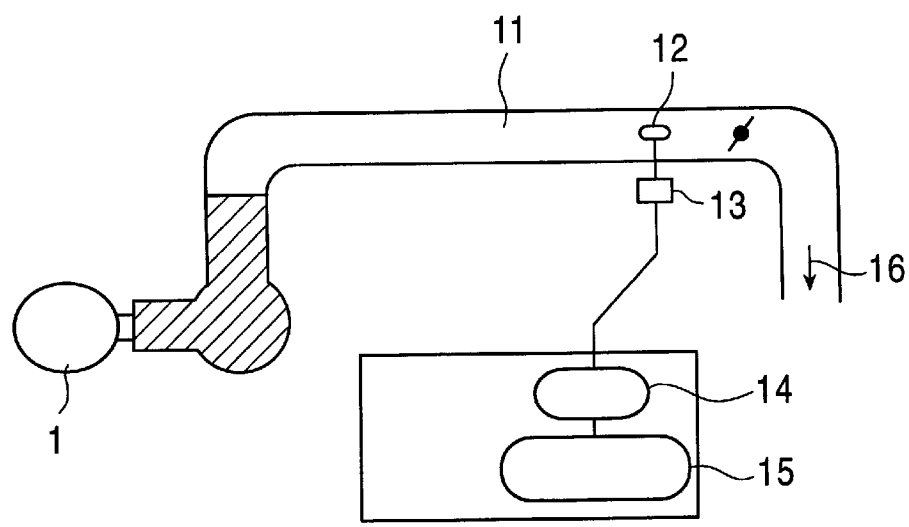
FIG. 2 is a longitudinal cross section showing an example of an apparatus for sucking the exhaust gas.

One of the features of the present invention is that a part of said exhaust gas is sucked by a flue (11) as shown in FIG. 2 and the amount of $NO_x$ in said sucked gas is determined by an $NO_x$ measuring apparatus (15). Thus, invasion of air into the arc spot is detected by the generated $NO_x$ and the adaptability of the slag foaming is judged. Accordingly, as another feature of the present invention, the present inventors thought to interrupt the melted steel from air during refining and heating stages based upon the judgement of adaptability of the slag foaming obtained by the above-mentioned measurement of $NO_x$ amount. In other words, as a result of the above-mentioned judgement, an operation for improving the slag foaming state for prevention of nitrification is conducted so that the arc spot area is completely covered by a slag in a foaming state. As an operation for improving said slag foaming state, bubbling of a carbon material into the slag is adopted in the present invention. To be more specific, the bubbling is conducted by the use of an oxygen-sending lance (6) as shown in FIG. 1. As a result, carbon monoxide gas is generated and a decreasing height of the slag (9) is increased. Until now, the improving operation for this slag foaming has been conducted by an operator watching the status of the operation (thus, when the electrode is covered by slag, noise of the arc becomes high) but, according to the present invention, such an operation can be done by machines whereby a nitrification during refining and heating stages can be steadily achieved.

In addition to the judgement of adaptability of the slag foaming state obtained by the above-mentioned $NO_x$ amount measurement, the judgement of slag foaming during the operation of the electric furnace can be quantified by, for example, evaluating the accumulated $NO_x$ amount in the exhaust gas measured as from a stage when the material is completely melted down. Thus, the measured $NO_x$ amounts in the exhaust gas are accumulated with certain intervals (for example, every 30 minutes) and then a slag foaming operation in which said accumulated $NO_x$ amount is made not more than 2000 ppm×min (may be referred to as a predetermined range) is conducted whereby it is now possible to conduct a method of operating the electric furnace where control is adjusted to the low nitrogen side in which nitrification is suppressed and the nitrogen amount in the melted steel is adjusted to be not more than 70 ppm. Here, the accumulated $NO_x$ amount is expressed by the following formula.

$$\Sigma(\text{Measured } NO_x \text{ Amount [ppm]}) \times (\text{Measuring Time [min]})$$

Another thing which is related to the $NO_x$ amount is that heat dissipation from the melted steel can be inhibited by means of slag foaming. Therefore, when a slag foaming operation for making the above accumulated $NO_x$ amount within a predetermined range is conducted, it is now possible to offer a method operating the electric furnace with a low electric power consumption rate wherein heat diffusion from the melted liquid is controlled and heating efficiency is improved. The reason why said predetermined range is adjusted to not more than 2000 ppm×min is that, if the range is more than that, the heating efficiency to the melted steel lowers down to the conventional level.

Incidentally, it is mentioned in the present invention that the carbon material used for an operation for improving the slag foaming state is preferably coke powder of not more than 0.2 mm in size. The reason is that, usually, coal and coke are available as a carbon material but coke is optimum because of little impurities and further that, the influence of nitrogen in air contained in pores of the grains when the grain size is big is to be avoided. With regard to coke powder in fine grains, the coke powder obtained from a dust cleaner of a CDQ device (coke dry quenching device) available in an iron mill can be preferably used. Further, in the present invention, at least 40–60% by weight of melted pig iron or solid pig iron is to be used when one or more which is/are selected from melted pig iron, solid pig iron, reduced iron and iron carbide is/are compounded as a part of the main material for electric furnace. Thus, carbon amount in the above-mentioned flat bath is increased and generation of carbon monoxide under the use of oxygen during refining and heating stages is promoted whereby not only the above-mentioned nitrification preventing operation but also denitrification by gas is attempted. In addition, according to the present invention, low-nitrogen melted steel is defined to be less than 70 ppm. The reason is that, if it is 70 ppm or more, steel material product of a high class cannot be manufactured.

EXAMPLES

Comparative Example

An electric arc furnace of a capacity of 100 tons as shown in FIG. 1 was used and low-nitrogen steel was manufactured where the outlet for slag (5) was completely closed. At that time, the flue (11) was equipped with an apparatus for measuring the $NO_x$ amount (usually, an $NO_x$ measuring apparatus (15) composed of an infrared gas analyzer being used) and an operation was conducted together with the measurement of said value.

First, iron scrap as a main material was poured into the furnace and then electricity is applied. As soon as the electricity is applied, an increase in $NO_x$ amount was observed at shown in FIG. 3 and, therefore, central area of the pile of the iron scrap was melted by electricity resulting in a hole to make the introduction of melted pig iron ready. Such an arrangement was completed after ten minutes from initiation of application of electricity and, therefore, electricity is made off and melted pig iron was introduced. During that time, the $NO_x$ amount became nil. When introduction of the melted pig iron was completed, electricity was applied again after 18 minutes. After that, the $NO_x$ amount suddenly increased but, after the elapse of time for 26–27 minutes, $NO_x$ generation decreased. After 40 minutes, the melted steel surface became flat and, therefore, it was judged that all material was completely melted (hereinafter, referred to as melt-down). Incidentally, the judgement for this melt-down may be conducted at the stage when the temperature of the melted steel became higher than 1550° C.

Figure 3:
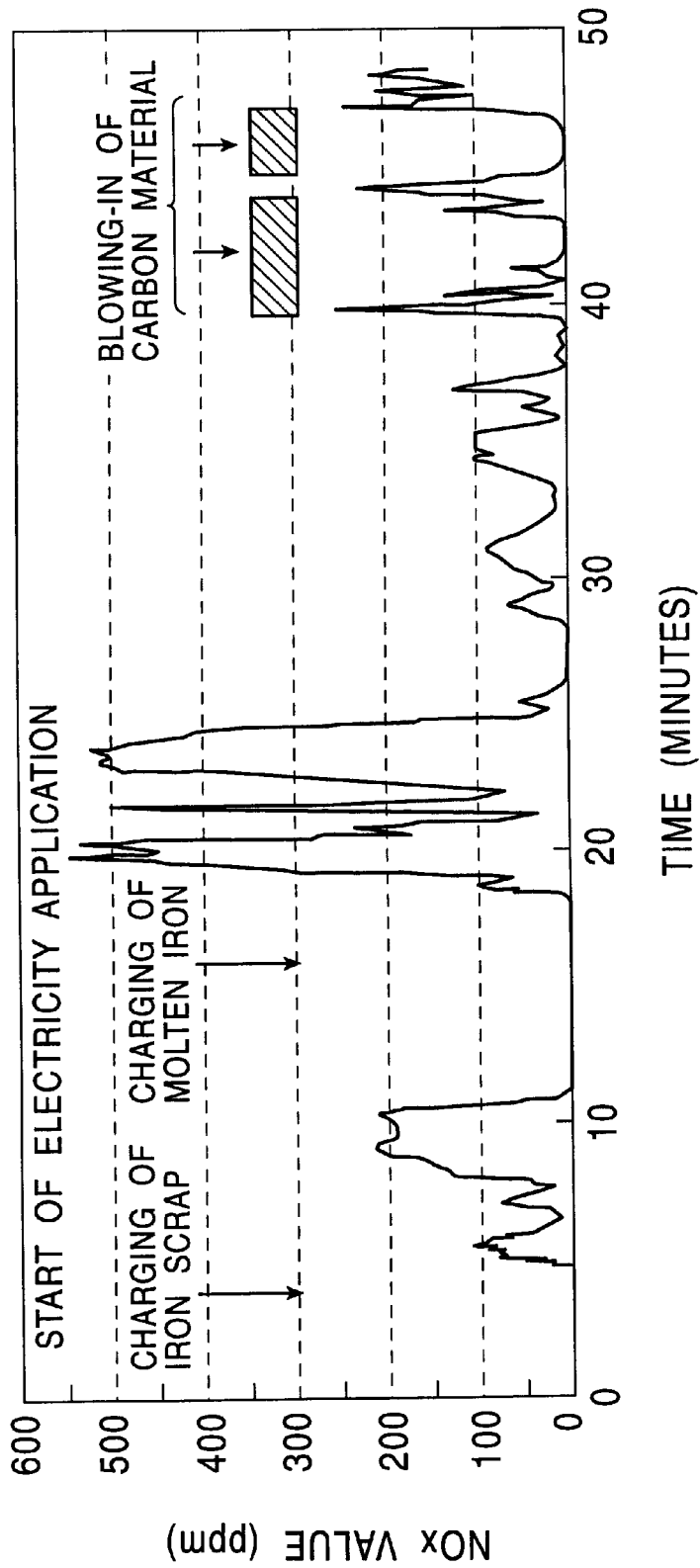
FIG. 3 shows a change of the $NO_x$ amount in the exhaust gas with a lapse of time during the operation of the comparative example.

Immediately after this melt-down, a refining stage started and decarburization was conducted by sending an oxygen from a lance as shown in FIG. 1. If the material is solely composed of iron scrap, the carbon amount is small and, therefore, carbon concentration is to be adjusted by adding a carbon material. With regard to the slag foaming state, an operator judged of its adaptability from the noise of the arc and conducted an operation for improving said state by bubbling a carbon material into the slag. However, considerable amount of $NO_x$ was detected. In FIG. 3, it is shown that bubbling of a carbon material is interrupted at the stage of about 45 minutes and that is because of a sampling from the melted steel.

Incidentally, the carbon material used in this operation was coke powder having a grain size range of 0.1–0.2 mm while the amount of nitrogen in the obtained melted steel was 100 ppm.

Example 1

Figure 4:
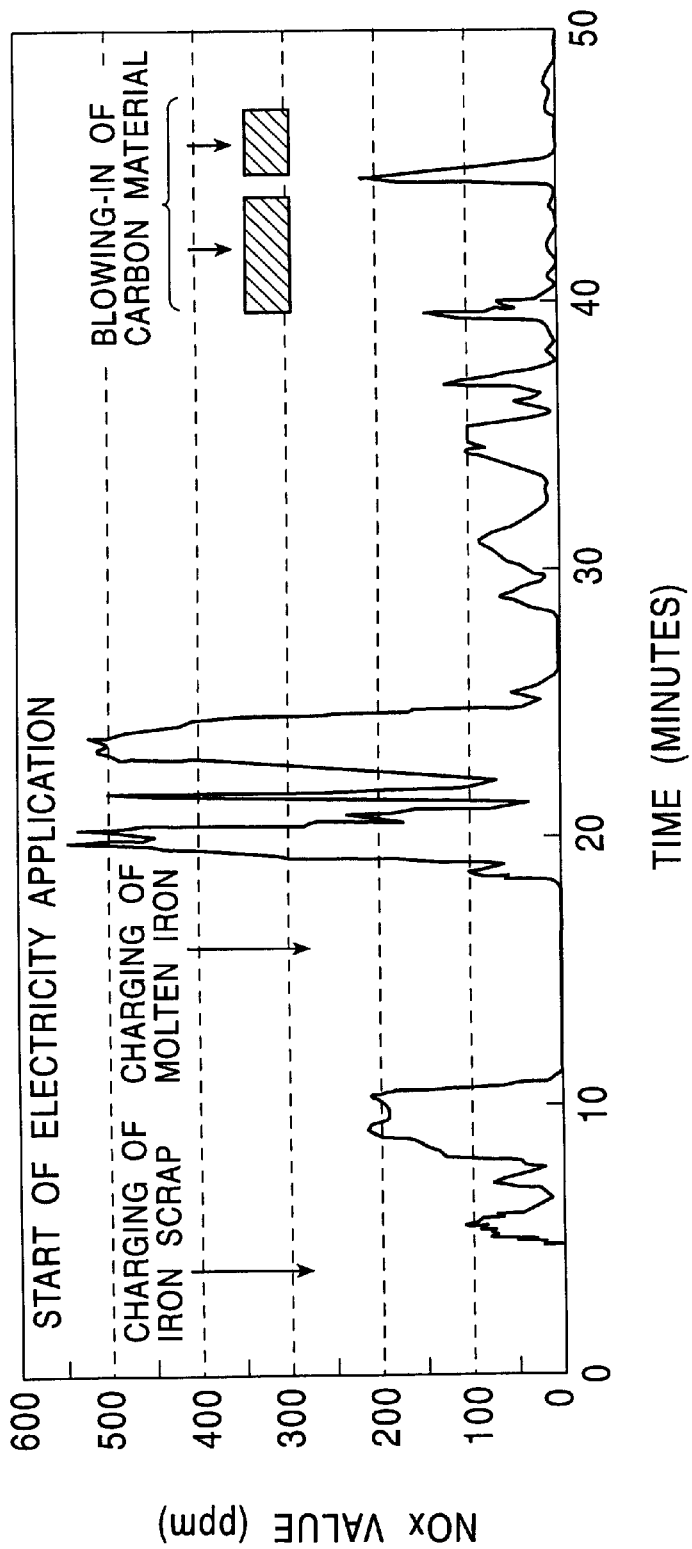
FIG. 4 shows a change of the $NO_x$ amount in the exhaust gas with a lapse of time during the operation of Example 1.

The same operation as in the above Comparative Example was conducted until the melt-down and, immediately from the refining stage after the melt-down, bubbling of a carbon material was conducted together with sending the oxygen and a method for judging the slag foaming and also a method for operating the electric furnace in accordance with the present invention were applied. The carbon material used here was coke powder having a grain size of not more than 0.2 mm recovered by a dust collector of the CDQ device of the iron mill. With regard to the $NO_x$ amount, as shown in FIG. 4, generation of $NO_x$ decreased almost at the same time with bubbling of the carbon material and it was apparent that the foaming state was improved. When bubbling of the carbon material was interrupted for sampling, an increase in the $NO_x$ amount was noted the same as before. As a result of the operation, the nitrogen amount in the melted steel after taking out the product was 50 ppm.

Example 2

Figure 5:
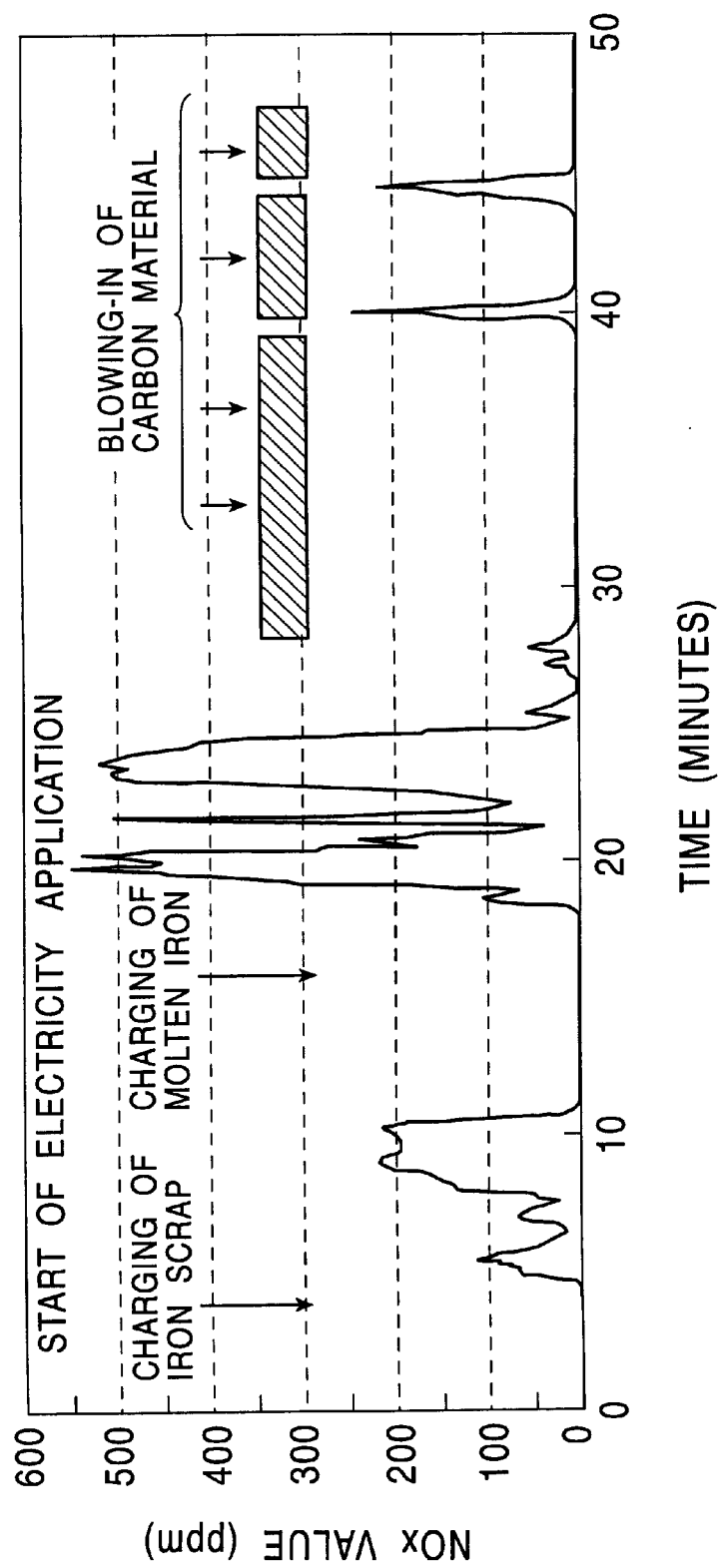
FIG. 5 shows a change of the $NO_x$ amount in the exhaust gas with a lapse of time during the operation of Example 2.

The same operation as in the Comparative Example was conducted until the elapse of 27 minutes from initiation of application of electricity and, after that, a carbon material having a size of not more than 0.2 mm was bubbled by the same manner as above. At about 40 minutes thereafter, bubbling of a carbon material was once interrupted because of judgement of the melt-down and, after that, the operation according to the present invention was started again. The state of generation of $NO_x$ at that time was as shown in FIG. 5. Incidentally, the amount of nitrogen in the melted steel after taking out the steel was 30 ppm.

Figure 6:
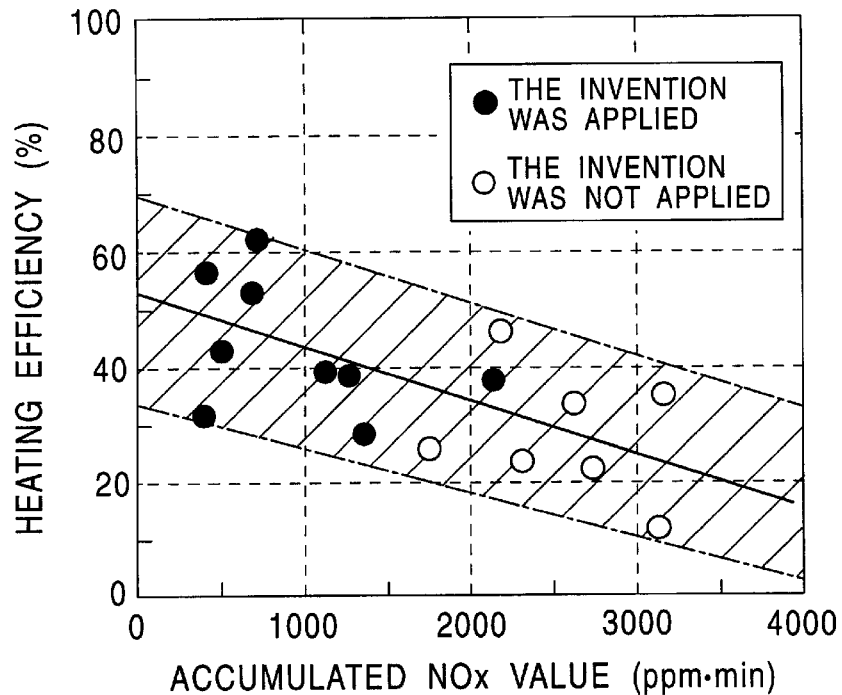
FIG. 6 shows a relation between the accumulated $NO_x$ amount and heated efficiency of the melted steel during the one-charge operation.

Then the electric furnace operation of the present invention as shown in Example 1 was conducted in many charges and the resulted data were analyzed. FIG. 6 shows the relation between the accumulated $NO_x$ amount and the heated efficiency of the melted steel by a one-charge operation. It is apparent from FIG. 6 that, in the case of operation where the period when the melted steel surface and arc are covered by a foamed slag are long, heat diffusion decreases and the heat of the arc is given to the melted steel.

The heating efficiency ($\eta\%$) is defined to be as follows.

Thus, in an electric furnace, the applied electric power differs depending upon the used scrap and the amount of melted pig iron until the material is melted down (referred to as MD). Therefore, heat input and heat output during the period of MD and that of taking out the steel (referred to as TAP) are compared and that is defined as a heating efficiency. Thus, the heating efficiency ($\eta\%$) is calculated by the following formula.

$$\eta\% = [S/(E+C_1+C_2)] \times 100$$

In the formula, E is electric power applied (Kwh/ch) (power applied from MD until TAP); $C_1$ and $C_2$ are heat input in the reaction of C+O→CO and are defined by the following formulae.

$$C_1 = [(MDC-TAPC) \times (\text{Charged Amount in kg}) \times (2200 \text{in kcal/kg})] / [(860 \text{ in kcal/kwh}) \times (\text{Charged Amount in } cht) \times 100]$$

In the formula, MDC is concentration of carbon in the melted steel during MD; and TAPC is concentration of carbon in the melted steel during TAP.

$$C_2 = [(C_{inj} \text{ in kg}) \times (2200 \text{ in kcal/kg})] / [(860 \text{ in kcal/kwh}) \times (\text{Charged Amount in } cht)]$$

In the formula, $C_{inj}$ is an injected amount of coke powder.

Those are heat input while heat output (S) is defined as a heat value applied in the heating operation for taking out the steel. Thus, $$S = [(\text{Temperature for Taking Out the Steel in } °\text{C.}) - (\text{Temperature for } MD \text{ in } °\text{C.}) \times (208 \text{ in kcal/}°\text{C.}cht)] / [860 \text{ in kcal/kwh}]$$

In FIG. 6, there is a correlation between the accumulated $NO_x$ value and the heating efficiency. Thus, when the measured $NO_x$ in exhaust gas is accumulated with certain intervals (such as every thirty seconds) and a slag foaming operation is conducted so that said accumulated $NO_x$ is made within a predetermined range of not more than 2000 ppm×min of accumulated amount as shown in FIG. 6, it is now possible to achieve an operating method of the electric furnace in which the heat diffusion can be suppressed and the heating efficiency is made higher to an extent of 10% or even more.

Figure 7:
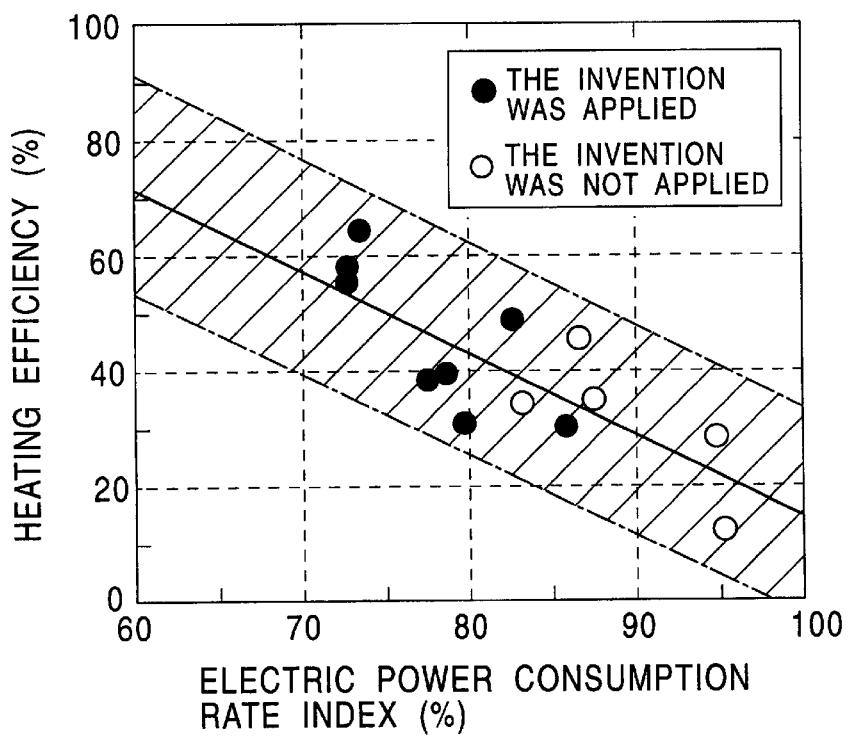
FIG. 7 shows the relation between the heated efficiency and the electric power consumption rate index.

Incidentally, FIG. 7 shows the relation between the above heating efficiency and the electric power consumption rate and, if the heating efficiency can be controlled to an extent of about 60%, the electric power consumption rate can be decreased to an extent of 20% as compared with the conventional operation. The result suggests that the present invention is useful not only in the manufacture of low-nitrogen melted steel but also in the manufacture of all types of steels including the operation by the sole use of scrap.

Figure 8:
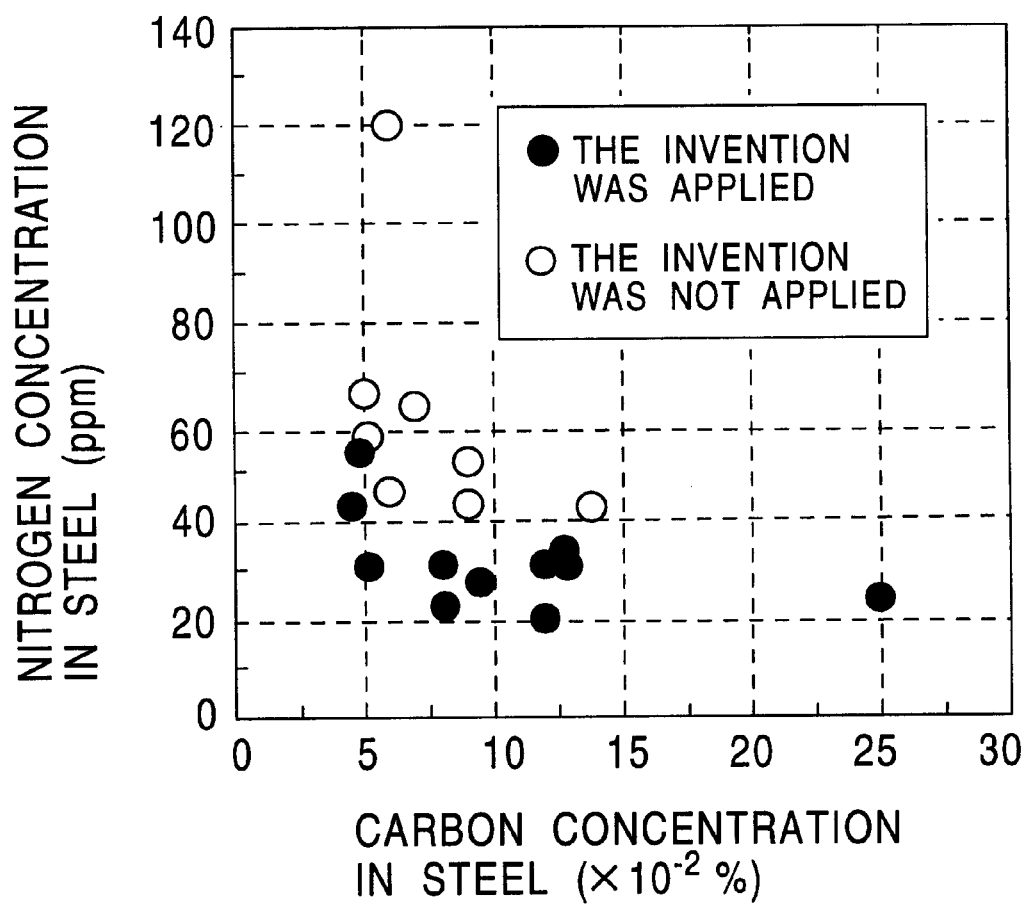
FIG. 8 shows the relation between the carbon amount in steel and the nitrogen amount in steel.

In addition, an operation was conducted using a material containing more carbon amount than iron scrap such as melted pig iron, solid pig iron, reduced iron and iron carbide so that the carbon concentration in the melted steel was previously increased. The relation between carbon and nitrogen in the melted steel obtained from the result thereof is summarized in FIG. 8. Again, in that case, there was a clear difference in terms of nitrification between the case where the present invention was applied and that where the present invention was not applied.

Industrial Applicability

As fully illustrated hereinabove, it is now possible in accordance with the present invention to measure by means of instruments whether the slag foaming state in an electric furnace steel manufacture is good or not. In addition, when the operation is conducted using such a judgement of foaming state as an index for control, it is now possible to steadily manufacture the low-nitrogen melted steel. Further, it is now clarified that electric power consumption rate in an electric furnace operation can be reduced by applying the present invention not only for the low-nitrogen melted steel but also for others.

What is claimed is:

1. A method for controlling the amount of nitrogen in a steel during manufacture in an electric arc furnace comprising the successive stages of:

melting iron scrap;

refining the melted iron scrap to produce a melted steel under a foaming slag; and heating the melted steel under the foaming slag;

measuring the amount of $NO_x$ in exhaust gas throughout refining and heating stages; and controlling the state of the foaming slag depending on the measured amount of $NO_x$ to control the amount of nitrogen in the steel to produce a low nitrogen steel containing less than 70 ppm of nitrogen;

wherein the refining stage and the measuring stage are initiated when melting of the iron scrap is finished and the melted steel surface becomes flat or when the melted steel temperature becomes higher than 1550° C.

2. The method according to claim 1, wherein the refining stage and the measuring stage are initiated when melting of the iron scrap is finished and the melted steel surface becomes flat.

3. The method according to claim 1, wherein the refining stage and the measuring stage are initiated when the melted steel temperature becomes higher than 1550° C.

4. The method according to claim 1, wherein the state of the foaming slag is controlled by bubbling a carbon material into the foaming slag in such a manner that the melted steel is covered by the foaming slag during the refining and heating stages of the melted steel.

5. The method according to claim 4, wherein the state of the foaming slag is controlled when the amount of $NO_x$ is 2000 ppm×min or less.

6. The method according to claim 4, wherein the carbon material is coke powder of 0.2 mm or smaller in size.

7. The method according to claim 5, wherein at least one material selected from the group consisting of melted pig iron, solid pig iron, reduced iron and iron carbide is compounded with the iron scrap to give a main material.

8. The method according to claim 7, wherein 40–60% by weight of the main material is melted pig iron and/or solid pig iron.

9. The method according to claim 1, wherein the amount of $NO_x$ measured is expressed by the formula:

$$\Sigma(\text{Measured } NO_x \text{ amount}) \times (\text{Measuring Time}).$$

* * * * *